United States Patent
Nishimura et al.

(10) Patent No.: US 9,889,816 B2
(45) Date of Patent: Feb. 13, 2018

(54) NON-COATED WOVEN FABRIC FOR AIR BAG

(71) Applicant: TOYOBO CO., LTD., Osaka-shi, Osaka (JP)

(72) Inventors: Hirokazu Nishimura, Otsu (JP); Toshio Owari, Tsuruga (JP); Shingo Sogabe, Tsuruga (JP); Miho Yamamoto, Otsu (JP); Yusuke Kojyo, Otsu (JP); Yoshihiro Matsui, Otsu (JP); Kenichi Funaki, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 615 days.

(21) Appl. No.: 14/394,420

(22) PCT Filed: May 8, 2013

(86) PCT No.: PCT/JP2013/062909
§ 371 (c)(1),
(2) Date: Oct. 14, 2014

(87) PCT Pub. No.: WO2013/168730
PCT Pub. Date: Nov. 14, 2013

(65) Prior Publication Data
US 2015/0079864 A1  Mar. 19, 2015

(30) Foreign Application Priority Data

| May 11, 2012 | (JP) | 2012-109450 |
| Jun. 20, 2012 | (JP) | 2012-138753 |
| Sep. 26, 2012 | (JP) | 2012-212391 |
| Sep. 28, 2012 | (JP) | 2012-217471 |

(51) Int. Cl.
*B60R 21/235* (2006.01)
*D03D 1/02* (2006.01)
*D01F 1/10* (2006.01)
*D01F 6/60* (2006.01)
*D03D 13/00* (2006.01)

(52) U.S. Cl.
CPC .............. *B60R 21/235* (2013.01); *D01F 1/10* (2013.01); *D01F 6/60* (2013.01); *D03D 1/02* (2013.01); *D03D 13/008* (2013.01); *B60R 2021/23509* (2013.01); *D10B 2331/02* (2013.01); *D10B 2505/124* (2013.01); *Y10T 442/30* (2015.04); *Y10T 442/3065* (2015.04)

(58) Field of Classification Search
CPC ......... B60R 2021/23509; B60R 21/235; D01F 1/10; D01F 6/60; D03D 13/008; D03D 1/02; D10B 2331/02; D10B 2505/124; Y10T 442/30; Y10T 442/3065
See application file for complete search history.

(56) References Cited

U.S. PATENT DOCUMENTS

| 5,707,733 A * | 1/1998 | Kurt ........................ D01F 6/60 428/364 |
| 6,022,817 A * | 2/2000 | Lewis .................. B60R 21/235 139/389 |
| 2014/0021705 A1* | 1/2014 | Youn ..................... B60R 21/235 280/730.1 |
| 2015/0017859 A1* | 1/2015 | Akechi ................. B60R 21/235 442/208 |
| 2015/0111451 A1* | 4/2015 | Date ....................... D03D 15/08 442/184 |
| 2015/0191142 A1* | 7/2015 | Youn ........................ D03D 1/02 442/189 |
| 2015/0246655 A1* | 9/2015 | Furuniwa ................. D03D 1/02 139/420 R |

FOREIGN PATENT DOCUMENTS

| JP | 03-137245 A | 6/1991 |
| JP | 04-281062 A | 10/1992 |
| JP | 06-184302 A | 7/1994 |
| JP | 09-279437 A | 10/1997 |
| JP | 2009-256860 A | 11/2009 |
| JP | 2011-131874 A | 7/2011 |
| JP | 2011-168938 A | 9/2011 |

OTHER PUBLICATIONS

Adanur, Sabit. Wellington Sears Handbook of Industrial Textiles. Technomic Publishing Co. Inc., Lancaster, PA. 1995. pp. 627-628.*
Extended (Supplementary) European Search Report dated Feb. 19, 2016, issued in counterpart European Patent Application No. 13787533.2. (5 pages).
English translation of the International Preliminary Report on Patentability (Form PCT/IB/373) of International Application No. PCT/JP2013/062909 dated Nov. 20, 2014 and Written Opinion (Form PCT/ISA/237) dated Aug. 13, 2014 (5 pages).
International Search Report dated Aug. 13, 2013, issued in corresponding application No. PCT/JP2013/062909.

* cited by examiner

*Primary Examiner* — Arti Singh-Pandey
(74) *Attorney, Agent, or Firm* — Westerman, Hattori, Daniels & Adrian,

(57) ABSTRACT

A non-coated woven fabric for air bag according to the present invention comprises a synthetic fiber containing 90% by weight or more of Nylon 66, characterized in that crimping rate of warp of the fabric is 10.0 to 13.0% while crimping rate of woof of the fabric is 6.0% or less, relative viscosity of Nylon 66 constituting the synthetic fiber in sulfuric acid is 3.15 to 3.7, the synthetic fiber contains 40 ppm to 200 ppm of phosphorus component and, when dynamic air permeability of the fabric is measured at a maximum pressure of 80±5 kPa based on ASTM D 6476 under the environment of 20° C.×65% RH, biaxial elongation strain hysteresis of the fabric during a transition from increased pressure to reduced pressure at 50 kPa is 0.69% to 1.0%.

5 Claims, 1 Drawing Sheet

[Fig. 1]
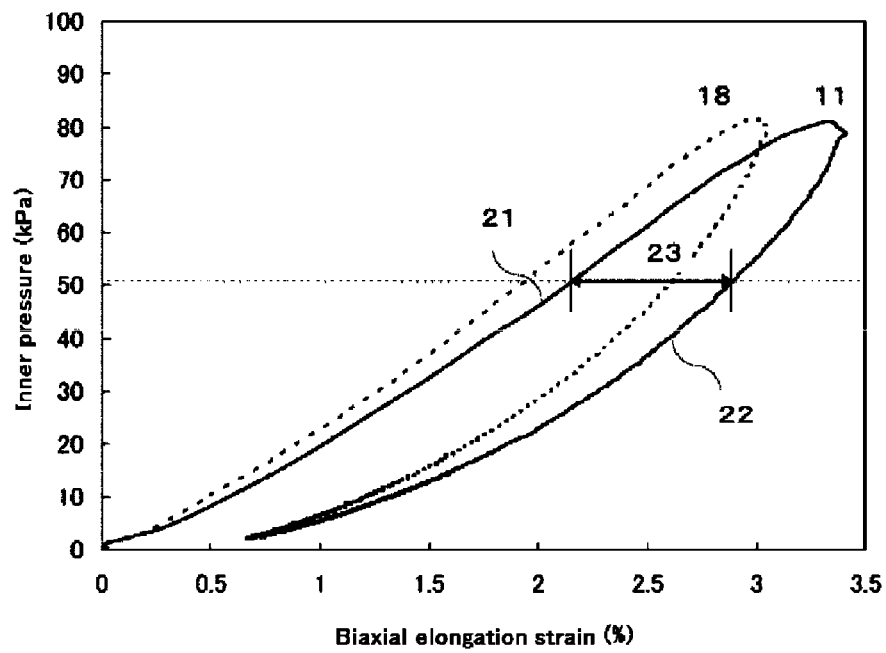
[Fig. 2]
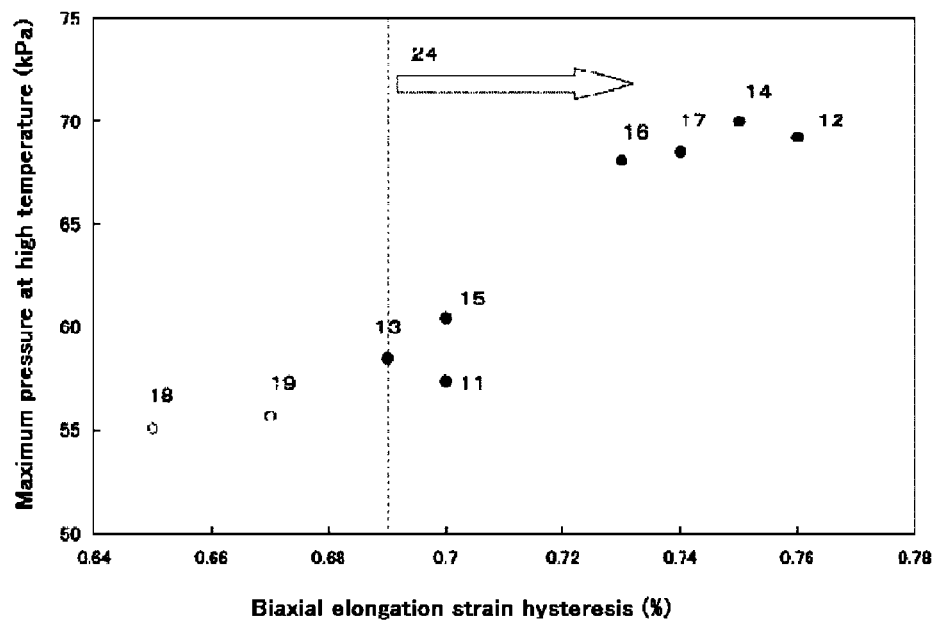

NON-COATED WOVEN FABRIC FOR AIR BAG

TECHNICAL FIELD OF THE INVENTION

The present invention relates to a non-coated woven fabric for air bag which is one of safety devices for a car. More particularly, it relates to a non-coated woven fabric for air bag which does not result in breaking of the air bag even when exposed to high-temperature and high-pressure gas during development the air bag and which is also excellent in flexibility, light weight and compactness.

BACKGROUND ART

An air bag has been quickly increasing in its installing rate in recent years as one of the safety parts for cars. The air bag is used for such a purpose that, in car crash, a sensor perceives the shock, gas of high temperature and high pressure is generated from an inflator and the air bag is quickly developed by the gas whereby the collision of the bodies or, particularly, the heads of a driver and a passenger to steering wheel, windshield, door glass, etc. is prevented and protected. At present, not only an air bag for a driver seat and a passenger seat coping with the collision from the front side of a car but also a knee air bag which protects the knee, a side air bag or a side curtain air bag which copes with the collision from the lateral side and an air bag which is provided for collision from back side have been adopted. Further, in recent years, an air bag which protects a collided pedestrian has been also known and the using sites of air bags have been steadily increasing now.

While production amounts of air bags are increasing, simplification of an inflator which is combined therewith so as to form an air bag module has been in progress for lowering the cost. As to an inflator, there have been known the so-called stored gas inflator wherein a plug of a metal container in which inert gas such as helium is sealed at high pressure is destroyed by gunpowder so that the gas is released therefrom; the so-called hybrid inflator wherein the gas filled in a relatively small amount is warmed by heat of combustion of gunpowder and the gas generated from gunpowder is combined with the filled gas; and a simple inflator called a pyro-inflator wherein gunpowder which is a gas generator in a solid form is burned. Recently, switching to the pyro-inflator has been in progress.

The pyro-inflator can be made into small size and light weight but, there are a lot of incomplete combustion products generated from gunpowder and floating microparticles due to the residue after combustion of gunpowder. Therefore, temperature of the gas flown into an air bag is higher than that in the conventional inflator and thermal load to a base fabric for air bag is high. Particularly in the so-called impactor evaluation (a method wherein a thing is collided with a developing air bag and the moved distance of the thing is evaluated), the moved distance of a thing is long in the case of an air bag using the conventionally used base fabric for air bag whereby there sometimes happens a phenomenon called "bottoming" (a phenomenon wherein the thing collides with a joining part of a base fabric for air bag).

Up to now, as to an index for succeeding in the impactor evaluation, air permeability of a woven fabric is adopted and it has been common that a base fabric having a low air permeability succeeds in the evaluation (refer to Patent Documents 1 and 2). With regard to air permeability, there have been known the so-called static air permeability in which the air permeability is measured with a constant differential pressure and the so-called dynamic air permeability in which inner pressure and deformed amount of a base fabric changing every moment are measured upon instant application of compressed air to the base fabric. In any of those methods, measurement is carried out at ordinary room temperature. However, in the recent air bag used in combination with a pyro-inflator, it is not always true that abase fabric for air bag having low air permeability at ordinary room temperature (i.e. a base fabric exhibiting high inner pressure as an air bag at ordinary room temperature) succeeds in the impactor evaluation.

It goes without saying that, when an air bag is made of a silicone-coated fabric, it does not fail in the impactor test even if it is used in combination with a pyro-inflator. However, a silicone-coated fabric lacks lightness and compactness and, in view of interior design in a car, such a one is a bit difficult to be used for the areas demanding the compactness such as a driver seat and a passenger seat. Therefore, a non-coated fabric has been still preferably used.

On the other hand, investigations for measures for high temperature inflator gas have been partially carried out as well. As one of them, investigation for a sewn portion of an air bag is also being carried out. However, even in this investigation, no evaluation at high temperature has been conducted and there is a problem that the measure for a pyro-inflator which has been used recently is difficult (refer to Patent Document 3).

PRIOR ART DOCUMENTS

Patent Documents

Patent Document 1: Japanese Patent Application Laid-Open (JP-A) No. 137245/91
Patent Document 2: Japanese Patent Application Laid-Open (JP-A) No. 281062/92
Patent Document 3: Japanese Patent Application Laid-Open (JP-A) No. 2011-131874

DISCLOSURE OF THE INVENTION

Problem that the Invention is to Solve

An object of the present invention is to solve the above-mentioned conventional problems. To be more specific, it is to provide a non-coated base fabric for air bag which can be used without problem even for pyro-inflators as well.

Means for Solving the Problem

A woven fabric for air bag according to the present invention comprises the following constitutions (1) to (6):

(1) A non-coated woven fabric for air bag which comprises a synthetic fiber containing 90% by weight or more of Nylon 66, characterized in that crimping rate of warp of the fabric is 10.0 to 13.0% while crimping rate of woof of the fabric is 6.0% or less, relative viscosity of Nylon 66 constituting the synthetic fiber in sulfuric acid is 3.15 to 3.7, the synthetic fiber contains 40 ppm to 200 ppm of phosphorus component and, when dynamic air permeability of the fabric is measured at a maximum pressure of 80±5 kPa based on ASTM D 6476 under the environment of 20° C.×65% RH, biaxial elongation strain hysteresis of the fabric during a transition from increased pressure to reduced pressure at 50 kPa is 0.69% to 1.0%.

(2) The non-coated woven fabric for air bag according to (1), wherein an olefin type fiber-treating agent is adhered to the fabric in an amount of 0.03% by weight to 0.60% by weight.

(3) The non-coated woven fabric for air bag according to (1) or (2), wherein cover factor of the fabric is 1900 to 2300.

(4) The non-coated woven fabric for air bag according to any of (1) to (3), wherein single yarn fineness of the synthetic fiber is 2 dtex to 7 dtex.

(5) The non-coated woven fabric for air bag according to any of (1) to (4), wherein difference between carboxyl terminal group concentration and amino terminal group concentration in Nylon 66 is 25 milli-equivalents per kg of polymer or less.

(6) The non-coated woven fabric for air bag according to any of (1) to (5), wherein the fabric satisfies the following relation:

$$Y \leq -2.5X+29,$$

wherein X is a value obtained by dividing the cover factor of the fabric by a mean value (dtex) of warp fineness and woof fineness, and Y is stiffness (N) in the warp direction defined by ASTM D 4032.

Advantages of the Invention

The woven fabric for air bag according to the present invention does not result in breaking the air bag even when exposed to high-temperature and high-pressure gas during development of the air bag and is also excellent in flexibility, light weight and compactness and it is particularly suitable for driver seat and passenger seat.

BRIEF DESCRIPTION OF THE DRAWINGS

FIG. 1 shows examples of plots of biaxial elongation strain versus inner pressure obtained by a dynamic air permeability test and measured pats of biaxial elongation strain hysteresis.

FIG. 2 shows the reached pressure in measurement of dynamic air permeability at high temperature to the biaxial elongation strain hysteresis.

BEST MODE FOR CARRYING OUT THE INVENTION

Hereinafter, the woven fabric for air bags according to the present invention will be illustrated in detail.

The synthetic fiber used for the fabric of the present invention, Nylon 66 which is excellent in durability to high temperature gas, is used in 90% by weight or more, preferably 95% by weight or more, and more preferably 100% by weight. In the synthetic fiber, a part of or all of it may be produced from a recycled raw material. In the synthetic fibers as such, various kinds of additives may be contained therein for a purpose of enhancing the step passing property in the manufacturing step for raw yarn or the after-processing step. Examples of the additive used therefor include antioxidant, thermostabilizer, flattening/smoothening agent, antistatic agent, thickener and flame retardant. Further, the synthetic fiber yarn may be a colored yarn.

It is necessary that the relative viscosity of Nylon 66 by sulfuric acid is 3.15 to 3.7. The lower limit of the relative viscosity is preferably 3.2 or more and, more preferably, 3.3 or more. The upper limit of the relative viscosity is preferably 3.65 or less and, more preferably, 3.6 or less. When the relative viscosity is less than the above range, strain hysteresis in measurement of dynamic air permeability which is described later is apt to become small. When the relative viscosity is more than that, not only is the cost for polymerization apt to become high but also the operation of spinning is apt to become bad.

As a result of preparing a woven fabric using a fiber based on a resin having high relative viscosity, accumulated pressure in measurement of dynamic air permeability at ordinary room temperature can be made low and the maximum reached pressure in measurement of dynamic air permeability at high temperature can be made high. In other words, the air permeability of a woven fabric can be suppressed to low levels at any of ordinary room temperature and high temperature. The reason therefor is likely that, as a result of a rise in the strain hysteresis, a flexible yarn is obtained by making the relative viscosity high even when a yarn having the same strength and elongation is prepared. When air pressure is applied crossing the thickness direction of a woven fabric prepared by using this flexible yarn, then the fiber and the filament constituting the fabric move relatively freely and move in the direction of filling the gaps of the fabric whereupon the air permeability in measurement of dynamic air permeability can be suppressed to low.

It is necessary that Nylon 66 contains 40 ppm to 200 ppm of phenylphosphonic acid or a metal salt thereof as a phosphorus component based on the weight of the polymer. In general, phenylphosphonic acid or the like has been used as a polymerization catalyst. The present inventors have found that by using phenylphosphonic acid or the like, it is possible to obtain high inner pressure-retaining property, especially in the measurement of dynamic air permeability at high temperature, even if relative viscosity of the resin is relatively low. In such a woven fabric, it is likely that a phosphorus component has a suppressing effect for cleavage of a molecular chain under a high temperature state and the molecular chain is hardly cleaved, and accordingly that the mutual intertwining of molecular chains is maintained and the yarn is hardly extended. Alternatively, it is also predicted that a reaction results due to the heat generated by a pyro-inflator etc. and to the presence of a phosphorus component whereby a molecular chain becomes long and it is also likely that the molecular chain cleavage under the high temperature state during development and the reaction of making the molecular chain long are concerted. The amount of the phosphorus component contained therein is preferred to be 45 ppm or more. However, when the phosphorus component is too much, an after-polymerization proceeds in a spinning stage whereby gelling may happen and operability of the spinning may become bad. The amount of the phosphorus component contained therein is preferred to be 150 ppm or less. As to a method for the production of Nylon 66 containing phenylphosphonic acid or a metal salt thereof, it is possible at the stage of a solution polymerization that phenylphosphonic acid or a metal salt thereof is added thereto or that phenylphosphinic acid or a metal salt thereof is added thereto. Phenylphosphinic acid or a salt thereof is oxidized during the step and is converted to phenylphosphonic acid or a salt thereof.

Even the woven fabric containing a specific amount of phosphorus component exhibits flexibility the same as in the case of using a highly viscous resin, and its strain hysteresis is apt to become high in measurement of dynamic air permeability. As a result of the use of phosphorus, the maximum pressure particularly at high temperature becomes high, and the fabric can now have a preferred property as an air bag cushion.

The fact that the strain hysteresis is high by a measuring device for dynamic air permeability indicates that the inner pressure is received by the base fabric as a whole and the ability for retaining the inner pressure is high. As a result, the air bag can hit a passenger with a softened shock and, at the same time, moving distance after collision of the passenger to the air bag can be easily decided or, in other words, adjustment of the amount of "discharged air from an air bag" can be easily done. In view of such points, the woven fabric of the present invention has a preferred use in an air bag.

Difference between the carboxyl terminal group concentration and the amino terminal group concentration in Nylon 66 is preferred to be 25 milli-equivalents or less per kg of a polymer. It is more preferred to be 1 to 23 milli-equivalents per kg of a polymer and further preferred to be 2 to 22 milli-equivalents per kg of a polymer. When the difference between the terminal group concentrations is too big, inner pressure of the woven fabric in measurement of dynamic air permeability under the high temperature state is apt to become low. When the amino terminal group concentration is higher, a tertiary amine is apt to be produced during melting and, as a result, operability for the spinning is apt to become bad.

As to Nylon 66, it is preferable that no terminal sequestering agent such as monoamine or monocarboxylic acid is used. When a terminal sequestering agent is used, effect of a phosphorus catalyst may become low.

With regard to apart of the above characteristics of Nylon 66 polymer, although there have been examples wherein yellow-turning coloration, gel generation and fatigue resistance are investigated, no finding for controlling the air permeability as a woven fabric to an instant high temperature gas has been achieved up to now.

In the manufacturing method of the present invention, total fineness of the raw yarn used therefor is preferred to be 100 dtex to 500 dtex and more preferred to be 150 dtex to 500 dtex. When the total fineness is less than the above range, tensile strength and tear strength are insufficient and there is a risk of resulting in a problem in terms of the strength. When the total fineness exceeds the above range, although there is no problem in terms of the strength, there is a risk that flexibility of the fabric is deteriorated and package ability lowers and, in addition, due to the fact that the fabric surface becomes hard, there is a risk that the skin of human body is injured upon collision. Further, as to the mechanical characteristic, it is preferred to be 8.0 cN/dtex or more, and more preferred to be 8.3 cN/dtex or more in terms of shear strength for satisfying the mechanical characteristic of a woven fabric which is demanded in use for an air bag. Although the strength is better when it is higher, the strength of the actually usable fiber is 12.0 cN/dtex or less.

Shrinking rate in boiling water of the synthetic fiber used for the woven fabric of the present invention is preferred to be 6 to 15%. It is more preferred to be 7% or more, further preferred to be 8% or more, and furthermore preferred to be 7 to 13%. When the shrinking rate in boiling water is less than the above range, the residual shrinking rate level necessary for the base fabric is apt to be hardly achieved. When the shrinking rate in boiling water is more than the above range, thickness of the fabric after shrinking becomes large and, at the same time, gaps are resulted among the yarns in warp and woof directions. Accordingly, not only package ability is inferior but also a reducing effect for air permeability is apt to be deteriorated. The shrinking rate in boiling water is measured according to JIS L 1095 9.24 method.

Single yarn fineness of the yarn which constitutes the woven fabric for air bags according to the present invention is preferred to be 2 to 7 dtex. When the single yarn fineness is more than the above range, inner pressure in measurement of dynamic air permeability is apt to become low. When the single yarn fineness is less than the above range, productivity of the fiber is apt to be deteriorated.

Filament number of the yarn constituting the woven fabric for air bags according to the present invention is preferred to be 60 to 300. It is more preferred to be 80 to 200. When the filament number is less than the above range, not only the package ability is apt to become bad but also the inner pressure in measurement of dynamic air permeability is apt to become low. When the filament number is more than the above range, productivity of the fiber is apt to become bad.

Thickness of the woven fabric for air bag according to the present invention is preferred to be 0.32 mm or less. It is more preferred to be 0.30 mm or less and further preferred to be 0.29 mm or less. Although the package ability is better when the thickness is thinner, the fineness of the yarn used for making thin also becomes small whereby there is a risk that the strength as a cloth cannot be maintained. Due to this reason, the lower limit of the thickness is preferred to be 0.22 mm or more, and more preferred to be 0.25 mm or more.

In the woven fabric for air bag according to the present invention, it is necessary that biaxial elongation strain hysteresis of the fabric during a transition from increased pressure to reduced pressure at 50 kPa is 0.69% or more, when dynamic air permeability of the fabric is measured at a maximum pressure of 80±5 kPa based on ASTM D 6476 under the environment of 20° C.×65% RH. As a result of making as such, when an air bag is inflated and developed to receive a passenger, it is now possible that leakage of the high temperature gas from the fabric is suppressed to the utmost, heating of the fabric due to heat exchange is suppressed, breakage of the air bag is prevented and, at the same time, inner pressure of an air bag is retained. Although upper limit of the strain hysteresis is not particularly limited, it is practically 1.0% or less as a base fabric to be used for air bag.

Cover factor (CF) of the woven fabric for air bag according to the present invention is preferred to be 1900 to 2300. It is more preferred to be 2000 to 2300. When the cover factor is too low, physical characteristics necessary for an air bag (such as tensile strength and tear strength) are apt to become low. The cover factor also greatly affects the air permeability in the initial stage. Although the cover factor is preferred to be larger since air permeability lowers thereby, there is a limitation therefor in view of the weaving stage and also of the package ability. Incidentally, the cover factor is determined according to the following formula:

$$\text{Cover factor} = [\text{fineness of warp(dtex)} * 0.9]^{(1/2)} \times [\text{density of warp(warp number/2.54 cm)}] + [\text{fineness of woof (dtex)} * 0.9]^{(1/2)} \times [\text{density of woof(woof number/2.54 cm)}]$$

Amount of the oil component remaining in a woven fabric for air bag according to the present invention is preferred to be 0.03 to 0.60% by weight to the woven fabric. When the oil component is less than 0.03% by weight, the inner pressure in measurement of dynamic air permeability under the high temperature state is apt to become low. There will be two reasons therefor. One is an effect of decreasing the friction coefficient between fiber and fiber and another is a film effect due to the use of an oil having a relatively low melting point. When content of the oil component is made 0.03% by weight or more, friction coefficient between fiber and fiber decreases whereby the fiber and the filament which constitute the woven fabric move relatively freely and move in the direction of filling the gap in the woven fabric and, as a result, inner pressure in measurement of dynamic air permeability can be made high. In addition, when the oil has a melting point of 60° C. or lower, the oil melts by heat when high temperature gas from an inflator hits the fabric and the oil moves in the direction of filing the gap in the woven fabric and covers the woven fabric surface whereby the inner pressure in measurement of dynamic air permeability can be made high. In view of the above, although there is no particular limitation for the oil so far as it has a melting point of 60° C. or lower, it is preferred, in taking the step of oil application into consideration, to be such an oil which has an emulsion form during application, decreases the friction coefficient between fiber and fiber after application, exists in a solid state at ordinary room temperature and melts when high temperature gas from an inflator hits the fabric. In the commonly known spinning oil or warping oil such as acrylic type oil or ester type oil, there has been known nothing which fulfills the above property. In the present invention, an olefin type oil is preferably used. The adhering amount of the oil to the woven fabric is preferred to be 0.04 to 0.30% by weight, and more preferred to be 0.05 to 0.25% by weight. When the adhering amount of the oil is more than 0.60% by weight, combustibility is apt to increase. There is no particular limitation for a method of applying an oil but it may be applied either as a spinning oil or as a warping oil after application of a spinning oil having a different composition. It is also possible that an oil in a predetermined amount is applied by means of dipping or coating during the after-treatment of the fabric.

The woven fabric for air bag according to the present invention is preferred to satisfy a formula: $Y \leq -2.5X+29$, wherein x is a value obtained by dividing the cover factor of the fabric by a mean value (dtex) of warp fineness and woof fineness, and Y is stiffness (N) in the warp direction defined by ASTM D 4032. As a result of satisfying this formula, it is now possible to maintain the durability against high temperature gas from an inflator or, in other words, to suppress the gas permeability under the high temperature state while the predetermined strength as a non-coated woven fabric for air bag is still achieved. Also, it is possible to make the non-coated woven fabric into light weight and compactness. In the case of numerals outside this range, it is apt to become difficult to achieve both of the gas permeability at high temperature and the light weight/compactness.

In a woven fabric for air bag, it is one of the demanded properties that the fabric is in light weight and is compact. In addition thereto, high strength as an air bag is also demanded. Achievement of the high strength can be resulted by the use of high fineness. However, thickness of the fabric increases using the high fineness and it inevitably increases the stiffness. The present inventors have divided the cover factor by the fineness so as to induce the item of "thickness wherein weaving density resulted by the fiber existing in the fabric is also taken into consideration. Then, the present inventors have clarified an appropriate relation thereof to the stiffness whereupon they have reached this demanded property.

Although there is no particular limitation for a method of weaving the woven fabric for air bag according to the present invention, a plain weaving is preferred when uniformity of the properties of the woven fabric is taken into consideration. In the yarn used therefor, warp and woof may not be the same and there is no problem at all even when they are different, for example, in their size, yarn number and fiber type. In a preparation step for weaving the woven fabric, it is preferred to apply the olefin type oil at least to warps. Effect of the olefin type oil has been mentioned already. As to a method for application, although there is a method for applying the oil as a spinning oil, such a method is less efficient because the oil is apt to be detached particularly when the weaving is conducted by means of water jets. When the adhesion is tried using a spinning oil, the oil component is apt to be separated out onto a heating roller during the spinning whereby a cleaning therefor is necessary resulting in worsening of the productivity.

It is preferred that the woven fabric for air bag according to the present invention is subjected to a thermal setting at the temperature of 160° C. or higher together with applying the tension of 200 to 800 N/m or more in the warp direction after the weaving. When the tension in the warp direction at the high temperature setting is less than 200 N/m, quality of the woven fabric is apt to become bad. When it is more than 800 N/m, shrinking rate is apt to become high. The tension in the warp direction at the high temperature setting is more preferred to be 300 to 600 N/m. Further, when the temperature for the thermal setting is lower than 160° C., shrinking rate is apt to become high while, when it is higher than 230° C., the woven fabric is apt to be discolored. The temperature for the thermal setting is more preferred to be 180 to 210° C. Although there is no particular limitation for the treating time for the thermal setting, it is preferred to be 10 seconds to 10 minutes, more preferred to be 30 seconds to 5 minutes, and further preferred to be 1 minute to 3 minutes.

In the woven fabric for air bag according to the present invention, it is necessary that crimping rate of warp is 10.0 to 13.0% while crimping rate of woof is 6.0% or less. When a crimping rate of warp is more than 13.0%, mesh opening part of the fabric is also apt to be expanded when the fabric is enlarged by the pressure during development of an air bag. Especially when the fabric is enlarged, the mesh opening part is expanded not in a uniform manner but in a non-uniform manner whereupon an easily expandable mesh opening part is formed. It is a matter of course that the amount of high temperature gas passing through a relatively large mesh opening part is more than that passing through a small mesh opening part. As a result, a woven fabric having the non-uniform mesh openings, especially an area having a particularly large mesh opening part thereof is apt to melt as compared with a woven fabric having the uniform mesh openings. The present inventors have found that, particularly when the crimping rate is high, movement of the yarn is apt to become big and the mesh opening part during expansion becomes large. Generally, a crimping rate of warp is more than that of woof in a woven fabric for air bag whereupon it is possible to make the mesh opening part small by making the crimping rate of warp small. As a result, the present inventors have established a measure for making the inner pressure during development of an air bag. When a crimping rate of woof is more than 6.0%, the fabric is apt to melt even when a crimping rate of a warp is made 13.0% or less. Further, when a crimping rate of warp is less than 10.0%, the fabric is apt to become hard resulting in inferior flexibility and compactness. Upper limit of the crimping rate of warp is preferred to be 12.5% or less and more preferred to be 12.3% or less. Lower limit thereof is preferred to be 10.5% or more, and more preferred to be 10.6% or more. Crimping rate of the woof is preferred to be 5.5% or less. Lower limit thereof is preferred to be 3.0% or more.

At high temperature, air permeation from the surface of woven fabric is apt to become large in the common woven fabric. In addition, the amount of the permeated air is also hard to be controlled since the base fabric temperature varies due to imbalance of the amount of gunpowder of an inflator. On the contrary, in the woven fabric for air bag according to the present invention, gas hardly permeates even under the high temperature state and the gas which did not permeate can be induced into a hole which is called a vent hole formed in the air bag. Therefore, in the case of settlement of the impactor characteristic, it can be controlled by the size of a vent hole whereby the bottoming hardly happens. Accordingly, the present invention is most suitable for a combination of the base fabric for air bag having a vent hole with the pyro-inflator being used advantageously as an air bag for a driver seat and a passenger seat.

EXAMPLES

As hereunder, the present invention will be more specifically illustrated by referring to Examples but the present invention is not limited to those Examples. Various evaluations in Examples were evaluated according to the following methods.

(1) Fineness Fineness was measured according to a method mentioned in JIS L 1095 9.4.1.

(2) Tensile Strength and Elongation at Break

Tensile strength and elongation at break of the woven fabric were measured according to a method mentioned in JIS L 1096 8.12.1.

(3) Stiffness

Stiffness was measured according to JIS L 1096 6.19.1A method (a 45° cantilever method).

(4) Stiffness (ASTM)

Stiffness (ASTM) was measured according to a method mentioned in ASTM D 4032 (2002).

(5) Measurement of Dynamic Air Permeability at Room Temperature and Biaxial Elongation Hysteresis Each of woven fabrics of Examples and Comparative Examples was cut out in 20 cm square to prepare a sample. Using this sample, measurement was conducted according to ASTM D 6476 under the following measuring condition. As a tester for air permeability, FX 3350 manufactured by TEXTEST AG was used. A strat volume of 200 cm³ was used. For each sample, accumulated pressure was changed to 150 kPa, 200 kPa and 250 kPa. Based on the obtained data, the reached pressures versus the accumulated pressures were plotted and the accumulated pressure was set so as to make the maximum pressure 80±5 kPa.

A sample in the same size was prepared freshly, measurement was conducted under the accumulated pressure as set above and it was confirmed that the maximum pressure was within a range of 80±5 kPa. When the maximum pressure was not within this range, the accumulated pressure was set again and the measurement was conducted again by preparing a new sample.

Relation between the measured pressure and the aeration velocity was incorporated into a computer using an L5110 evaluation program Labodata II (manufactured by TEXTEST AG) to give the relation between the biaxial elongation strain and the pressure. A biaxial elongation strain hysteresis was determined from the difference between the strain during pressure decrease and the strain during pressure increase at 50 kPa in the resulting drawing. The measurement was carried out in a chamber controlled under the environment of 20° C. and 65% RH.

(6) Dynamic Air Permeability and Reached Pressure During Heating

A woven fabric (20 cm×20 cm) was allowed to stand in an oven of 180° C. for about one minute. Then it was taken out from the oven and, within one minute, its dynamic air permeability was measured. Average temperature within a range of 3.5 cm radius from the center of the woven fabric at that time was within a range of 50 to 65° C. Dynamic air permeability was measured by FX 3350 manufactured by TEXTEST AG under the filled pressure of 225 kpa and the filled volume of 200 cc. When temperature of the woven fabric immediately after the measurement was lower than 50° C., the measurement was tried again. The measurement was carried out in a chamber controlled under the environment of 20° C. and 65% RH. The "temperature of the woven fabric immediately after the measurement" was confirmed by directly taking the picture of the fabric from the lower part of the device of Theama CAM SC 640 manufactured by Flir System used therefor.

(7) Relative Viscosity by Sulfuric Acid

The woven fabric after extraction of the oil component by a Soxhlet method was used as a specimen. The specimen was dissolved in 96.3±0.1% by weight of concentrated sulfuric acid (special reagent grade) for making the specimen concentration 10 mg/ml to prepare a sample solution. The relative viscosity of the solution was measured at the temperature of 20° C.±0.05° C. using an Ostwald viscometer with the water dropping time of 6 to 7 seconds. The relative viscosity (RV) was calculated using the following formula from the dropping time T0 (in second(s)) of the same sulfuric acid as that used for preparing the sample solution and the dropping time T1 (in second(s)) of 20 ml of the sample solution using the same viscometer in the measurement:

$$RV=T1/T0$$

(8) Concentration of Amino Terminal Group

A Nylon 66 fiber sample which had been subjected to a defatting treatment with dichloromethane was precisely weighed and dissolved in a 90% aqueous solution of phenol. After a sample was completely dissolved, titration was carried out using a 0.05N aqueous solution of hydrochloric acid until the pH of the solution reached 3. From the titrated amount, concentration of amino terminal group per kg of the polymer was calculated.

(9) Concentration of Carboxyl Terminal Group

A Nylon 66 fiber sample which had been subjected to the defatting treatment by the same method as above was precisely weighed and dissolved in benzyl alcohol of 170° C. After the sample was completely dissolved, a phenolphthalein indicator was added thereto. After that, a colorimetric titration was conducted using a 0.1N ethylene glycol solution of NaOH. From the titrated amount, concentration of carboxyl terminal group per kg of the polymer was calculated.

(10) Measurement of Phosphorus Component in Woven Fabric

The woven fabric was cut into about 40 mm square using scissors made of stainless steel, layered into a sufficient thickness and analyzed by X-ray fluorescence method using Rigaku ZSX 100e (4.0 kW Rh Tube) manufactured by Rigaku Corporation. Diameter to be measured was set to 30 mm and the phosphorus component in the woven fabric was quantified by a fundamental parameter method.

Example 1

Phenylphosphonic acid was added to Nylon 66 chip prepared by a liquid phase polymerization so as to make the phosphorus component 80 ppm and then a 5% by weight aqueous solution of copper iodide was added as an antioxidant thereto followed by mixing so that 68 ppm in terms of copper to the polymer weight was adsorbed therewith. After that, a 50% by weight aqueous solution of potassium iodide and a 20% by weight aqueous solution of potassium bromide were added thereto so that each 0.1 part by weight of potassium to 100 parts by weight of the polymer chip was adsorbed therewith. Then a solid phase polymerization was carried out using a batch-type solid-phase polymerization apparatus to give pellets of Nylon 66 having the relative viscosity in sulfuric acid of 3.6.

The resulting Nylon 66 pellets were supplied to an extruder and subjected to a melt spinning at 297° C. Each spinning nozzle used therefor has hole numbers corresponding to filament numbers shown in Table 1, wherein a discharge hole therein has 0.8 mm diameter and 2 mm land length.

Discharging amount was adjusted by a measuring pump in such a manner that the total fineness became the value shown in Table 1. The pellets discharged from the spinning nozzle were subjected to extension and thermal setting and then wound around. Relative viscosity of the resulting raw yarn in sulfuric acid (RVf) was 3.57. Properties of the resulting raw yarn are shown in Table 1.

The resulting yarns were used as warp and woof and then woven in a water jet loom. Weaving density was set so as to give 55 warps per 2.54 cm and 55 woofs per 2.54 cm. After that, the resulting fabric was passed through a hot-water shrinking vessel without drying and then passed through a drying/finishing step using a suction drum drier. Properties of the resulting fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator.

Example 2

Spinning, elongation and weaving were conducted according to the same manner as in Example 1 except that setting of filament numbers and single yarn fineness in melt spinning was changed. Properties of the resulting raw yarns and fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator.

Example 3

Solid-phase polymerization, spinning, elongation and weaving were conducted according to the same manner as in Example 1 except that phenylphosphonic acid was added so as to make the phosphorus component 50 ppm after the liquid phase polymerization and that relative viscosity in sulfuric acid after solid-phase polymerization became 3.15. Properties of the resulting raw yarns and fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator. Content of the phosphorus components in the fabric was also 50 ppm.

Example 4

Spinning, elongation and weaving were conducted according to the same manner as in Example 3 except that setting of filament numbers and single yarn fineness in melt spinning was changed. Properties of the resulting raw yarns and fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator.

Example 5

Polymerization, spinning and weaving were conducted according to the same manner as in Example 4 except that after-polymerization was conducted by making the spinning temperature high so as to make the relative viscosity of the fiber in sulfuric acid 3.28, and that setting of the weaving density in weaving was changed so as to give 53 warps per 2.54 cm and 53 woofs per 2.54 cm. Properties of the resulting raw yarns and fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator.

Example 6

Polymerization, spinning and weaving were conducted according to the same manner as in Example 5 except that "Afterwax 300" (an olefin type fiber-treating agent) manufactured by Matsumoto Yushi Seiyaku was applied during warping. Properties of the resulting raw yarns and fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator.

Example 7

Polymerization, spinning and weaving were conducted according to the same manner as in Example 6 except that setting of single yarn fineness was changed and weaving density was changed to 61 warps per 2.54 cm and 61 woofs per 2.54 cm. Properties of the resulting raw yarns and fabric are shown in Table 1. In the resulting fabric, the strain hysteresis in measurement of dynamic air permeability was big and the maximum pressure in measurement of dynamic air permeability at high-temperature heating was high and it was a non-coated woven fabric particularly suitable for a pyro-inflator.

Comparative Example 1

Polymerization, spinning and weaving were conducted according to the same manner as in Example 1 except that no phenylphosphonic acid was added after a liquid-phase polymerization and that RV at a solid-phase polymerization was set to 3.4. Properties of the resulting raw yarns and fabric are shown in Table 1. In this Comparative Example 1, degree of polymerization was low, no phosphorus-type additive was used and no olefin type fiber-treating agent was applied whereby an air bag having small strain hysteresis was resulted. It was also a non-coated woven fabric which showed the low maximum pressure in measurement of dynamic air permeability at high-temperature heating and was not suitable for a pyro-inflator.

Comparative Example 2

Polymerization, spinning and weaving were conducted according to the same manner as in Comparative Example 1 except that setting of filament numbers and single yarn fineness in melt spinning was changed. Properties of the resulting raw yarns and fabric are shown in Table 1.

In this Comparative Example 2, degree of polymerization was low, no phosphorus-type additive was used and no olefin type fiber-treating agent was applied whereby an air bag having small strain hysteresis was resulted. It was also a non-coated woven fabric which showed the low maximum pressure in measurement of dynamic air permeability at high-temperature heating and was not suitable for a pyro-inflator.

TABLE 1

|  |  | Example 1 | Example 2 | Example 3 |
|---|---|---|---|---|
| Fineness | dtex | 470 | 470 | 470 |
| Single yarn fineness | dtex | 6.53 | 3.26 | 6.53 |
| Filament number |  | 72 | 144 | 72 |
| Crimping rate of warp | % | 10.8 | 12.4 | 11 |
| Crimping rate of woof | % | 4.4 | 5.2 | 5.5 |
| Strength | cN/dtex | 8.5 | 8.4 | 8.5 |
| Elongation | % | 25.6 | 24.5 | 25.1 |
| Relative viscosity of fiber in sulfuric acid (RVf) |  | 3.57 | 3.57 | 3.2 |
| Carboxyl terminal group concentration | milli-equivalents per kg of polymer | 47 | 47 | 53 |
| Amino terminal group concentration | milli-equivalents per kg of polymer | 32 | 32 | 32 |
| Difference between carboxyl terminal group concentration and amino terminal group concentration | milli-equivalents per kg of polymer | 15 | 15 | 21 |
| P type additive |  | phenyl-phosphonic acid | phenyl-phosphonic acid | phenyl-phosphonic acid |
| Content of P components | ppm | 80 | 80 | 50 |
| Weaving density | number of yarns per 2.54 cm | 55 | 55 | 55 |
| CF |  | 2262 | 2262 | 2262 |
| Kind of olefin type fiber-treating agent in warping |  | — | — | — |
| Adhering amount of olefin type fiber-treating agent to fabric | % | 0.05 | 0.05 | 0.05 |
| Thickness | mm | 0.33 | 0.31 | 0.32 |
| Tensile strength (warp/woof) | N/cm | 742/761 | 779/781 | 762/774 |
| Elongation at break (warp/woof) | % | 36.5/28.2 | 35.1/25.6 | 35.5/27.9 |
| Tear strength (warp/woof) | N | 290/314 | 249/274 | 238/262 |
| Stiffness JIS (warp/woof) | mm | 92/124 | 81/120 | 90/118 |
| Stiffness (ASTM) (Y) | N | 25 | 15 | 19 |
| CF/fineness (X) |  | 4.8 | 4.8 | 4.8 |
| Value of −2.5X + 29 |  | 17 | 17 | 17 |
| Accumulated pressure in measurement of dynamic air permeability at room temperature | kPa | 225 | 165 | 225 |
| Maximum pressure in measurement of dynamic air permeability at room temperature | kPa | 82 | 81 | 81 |
| Strain hysteresis in measurement of dynamic air permeability at room temperature | % | 0.70 | 0.76 | 0.69 |
| Maximum pressure in measurement of the dynamic air permeability at heating | kPa | 57.4 | 69.2 | 58.5 |

|  |  | Example 4 | Example 5 | Example 6 |
|---|---|---|---|---|
| Fineness | dtex | 470 | 470 | 470 |
| Single yarn fineness | dtex | 3.26 | 3.26 | 3.26 |
| Filament number |  | 144 | 144 | 144 |
| Crimping rate of warp | % | 12.1 | 11.9 | 11.1 |
| Crimping rate of woof | % | 4.7 | 3.8 | 4.2 |
| Strength | cN/dtex | 8.6 | 8.4 | 8.4 |
| Elongation | % | 24.9 | 24.3 | 24.3 |
| Relative viscosity of fiber in sulfuric acid (RVf) |  | 3.2 | 3.28 | 3.28 |
| Carboxyl terminal group concentration | milli-equivalents per kg of polymer | 53 | 52 | 52 |
| Amino terminal group concentration | milli-equivalents per kg of polymer | 32 | 38 | 38 |
| Difference between carboxyl terminal group concentration and amino terminal group concentration | milli-equivalents per kg of polymer | 21 | 14 | 14 |
| P type additive |  | phenyl-phosphonic acid | phenyl-phosphonic acid | phenyl-phosphonic acid |

TABLE 1-continued

| | | | | |
|---|---|---|---|---|
| Content of P components | ppm | 50 | 50 | 50 |
| Weaving density | number of yarns per 2.54 cm | 55 | 53 | 53 |
| CF | | 2262 | 2180 | 2180 |
| Kind of olefin type fiber-treating agent in warping | | — | — | Afterwax 300 |
| Adhering amount of olefin type fiber-treating agent to fabric | % | 0.05 | 0.05 | 0.18 |
| Thickness | mm | 0.32 | 0.32 | 0.32 |
| Tensile strength (warp/woof) | N/cm | 764/773 | 727/747 | 739/731 |
| Elongation at break (warp/woof) | % | 34.9/30.2 | 38.8/29.9 | 38.5/29.1 |
| Tear strength (warp/woof) | N | 240/243 | 250/252 | 272/278 |
| Stiffness JIS (warp/woof) | mm | 85/110 | 77/112 | 76/112 |
| Stiffness (ASTM) (Y) | N | 14 | 12 | 14 |
| CF/fineness (X) | | 4.8 | 4.6 | 4.6 |
| Value of −2.5X + 29 | | 17 | 17 | 17 |
| Accumulated pressure in measurement of dynamic air permeability at room temperature | kPa | 165 | 165 | 165 |
| Maximum pressure in measurement of dynamic air permeability at room temperature | kPa | 80 | 82 | 83 |
| Strain hysteresis in measurement of dynamic air permeability at room temperature | % | 0.75 | 0.70 | 0.73 |
| Maximum pressure in measurement of the dynamic air permeability at heating | kPa | 70.0 | 60.5 | 68.1 |

| | | Example 7 | Comparative Example 1 | Comparative Example 2 |
|---|---|---|---|---|
| Fineness | dtex | 350 | 470 | 470 |
| Single yarn fineness | dtex | 2.43 | 6.53 | 3.26 |
| Filament number | | 144 | 72 | 144 |
| Crimping rate of warp | % | 10.8 | 11.2 | 9.5 |
| Crimping rate of woof | % | 4.7 | 2.9 | 4.3 |
| Strength | cN/dtex | 8.5 | 8.5 | 8.5 |
| Elongation | % | 24.5 | 23.6 | 23.6 |
| Relative viscosity of fiber in sulfuric acid (RVf) | | 3.28 | 3.1 | 3.1 |
| Carboxyl terminal group concentration | milli-equivalents per kg of polymer | 52 | 59 | 59 |
| Amino terminal group concentration | milli-equivalents per kg of polymer | 38 | 31 | 31 |
| Difference between carboxyl terminal group concentration and amino terminal group concentration | milli-equivalents per kg of polymer | 14 | 28 | 28 |
| P type additive | | phenyl-phosphonic acid | — | — |
| Content of P components | ppm | 50 | — | — |
| Weaving density | number of yarns per 2.54 cm | 61 | 55 | 55 |
| CF | | 2165 | 2262 | 2262 |
| Kind of olefin type fiber-treating agent in warping | | Afterwax 300 | — | — |
| Adhering amount of olefin type fiber-treating agent to fabric | % | 0.18 | — | — |
| Thickness | mm | 0.27 | 0.32 | 0.31 |
| Tensile strength (warp/woof) | N/cm | 650/650 | 783/798 | 791/778 |
| Elongation at break (warp/woof) | % | 38.2/29.1 | 33.7/26.3 | 30.1/28.5 |
| Tear strength (warp/woof) | N | 230/241 | 250/275 | 261/269 |
| Stiffness JIS (warp/woof) | mm | 61/99 | 95/122 | 87/120 |
| Stiffness (ASTM) (Y) | N | 10 | 21 | 18 |
| CF/fineness (X) | | 6.2 | 4.8 | 4.8 |
| Value of −2.5X + 29 | | 14 | 17 | 17 |
| Accumulated pressure in measurement of dynamic air permeability at room temperature | kPa | 165 | 230 | 170 |
| Maximum pressure in measurement of dynamic air permeability at room temperature | kPa | 82 | 82 | 82 |
| Strain hysteresis in measurement of dynamic air permeability at room temperature | % | 0.74 | 0.65 | 0.67 |
| Maximum pressure in measurement of the dynamic air permeability at heating | kPa | 68.5 | 55.1 | 55.7 |

INDUSTRIAL APPLICABILITY

In the woven fabric for air bag in accordance with the present invention, it is now possible to enhance the heat resistance and the preventive property for gas leakage of an air bag during development with high temperature and high pressure. Also, the woven fabric for air bag according to the present invention does not results in breaking of the air bag even when exposed to high-temperature and high-pressure gas during development of the air bag and is also excellent in flexibility, light weight and compactness and it is particularly suitable to be used for driver seat and passenger seat.

EXPLANATION OF REFERENCE NUMBER

11: Measured values in Example 1
12: Measured values in Example 2
13: Measured values in Example 3
14: Measured values in Example 4
15: Measured values in Example 5
16: Measured values in Example 6
17: Measured values in Example 7
18: Measured values in Comparative Example 1
19: Measured values in Comparative Example 2
21: Curve under increased pressure
22: Curve under reduced pressure
23: Biaxial elongation strain hysteresis
24: Range wherein biaxial elongation strain hysteresis is 0.69% or more

The invention claimed is:

1. A non-coated woven fabric for air bag which comprises a synthetic fiber containing 90% by weight or more of Nylon 66,
   wherein the fabric has a crimping rate of warp of 10.0 to 13.0% and a crimping rate of woof of 6.0% or less,
   wherein the woven fiber has a relative viscosity of in sulfuric acid of 3.15 to 3.7, the woven fiber contains 40 ppm to 200 ppm of phosphorus component and,
   wherein the fabric has a dynamic air permeability measuring at a maximum pressure of 80±5 kPa based on ASTM D 6476 under the environment of 20° C.×65% RH,
   wherein cover factor of the fabric is 1900 to 2300, and
   wherein the fabric has a biaxial elongation strain hysteresis during a transition from increased pressure to reduced pressure at 50 kPa of 0.69% to 1.0%.

2. The non-coated woven fabric for air bag according to claim 1, wherein an olefin fiber-treating agent is adhered to the fabric in an amount of 0.03% by weight to 0.60% by weight.

3. The non-coated woven fabric for air bag according to claim 1, wherein single yarn fineness of the synthetic fiber is 2 dtex to 7 dtex.

4. The non-coated woven fabric for air bag according to claim 1, wherein difference between carboxyl terminal group concentration and amino terminal group concentration in Nylon 66 is 25 milli-equivalents per kg of polymer or less.

5. The non-coated woven fabric for air bag according to claim 1, wherein the fabric satisfies the following relation:

$$Y \leq -2.5X + 29,$$

wherein X is a value obtained by dividing the cover factor of the fabric by a mean value (dtex) of warp fineness and woof fineness, and Y is stiffness (N) in the warp direction defined by ASTM D 4032.

* * * * *